(12) United States Patent
Tsukamoto et al.

(10) Patent No.: US 12,012,726 B2
(45) Date of Patent: Jun. 18, 2024

(54) DISPLAY SYSTEM FOR WORK MACHINE

(71) Applicant: KOMATSU LTD., Tokyo (JP)

(72) Inventors: Takashi Tsukamoto, Tokyo (JP); Tomoki Andou, Tokyo (JP); Masahiro Ikeda, Tokyo (JP); Sueyoshi Nishimine, Tokyo (JP); Yasuhiro Kawamoto, Tokyo (JP); Atsuhito Kawahara, Tokyo (JP); Souichi Tsumura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 771 days.

(21) Appl. No.: 16/973,902

(22) PCT Filed: Aug. 20, 2019

(86) PCT No.: PCT/JP2019/032390
§ 371 (c)(1),
(2) Date: Dec. 10, 2020

(87) PCT Pub. No.: WO2020/050005
PCT Pub. Date: Mar. 12, 2020

(65) Prior Publication Data
US 2021/0246635 A1 Aug. 12, 2021

(30) Foreign Application Priority Data
Sep. 3, 2018 (JP) ................. 2018-164761

(51) Int. Cl.
*E02F 9/26* (2006.01)
*E02F 3/76* (2006.01)

(52) U.S. Cl.
CPC .............. *E02F 9/26* (2013.01); *E02F 3/7609* (2013.01); *B60R 2300/105* (2013.01); *B60R 2300/802* (2013.01)

(58) Field of Classification Search
CPC .......... H04N 7/18; E02F 3/7609; E02F 9/261; E02F 3/841; E02F 9/205; E02F 9/26; E02F 3/7604; B60R 2300/802; B60R 2300/105
See application file for complete search history.

(56) References Cited

U.S. PATENT DOCUMENTS

| 4,776,750 | A | * | 10/1988 | Griswold, Jr. | .......... | E02F 9/205 37/348 |
| 8,272,467 | B1 | * | 9/2012 | Staab | ..................... | G08C 17/02 701/50 |

(Continued)

FOREIGN PATENT DOCUMENTS

JP   H10-145777 A   5/1998
JP   2002-036954 A   2/2002

(Continued)

*Primary Examiner* — Stephen Holwerda
(74) *Attorney, Agent, or Firm* — Faegre Drinker Biddle & Reath LLP (57) ABSTRACT

An amount of information of data of a captured image displayed on a display unit is increased. A display control unit sets a plurality of divided display sections for a display unit. The display control unit sets a first camera group and a second camera group including one or more of a plurality of cameras. The first camera group captures an image of a work performed with a blade. The second camera group captures an image of a work performed with a ripper. The display control unit displays data of captured images output from cameras included in one of the first and second camera groups in a corresponding plurality of divided display sections.

8 Claims, 7 Drawing Sheets

(56) References Cited

U.S. PATENT DOCUMENTS

| | | | |
|---|---|---|---|
| 2003/0226290 A1* | 12/2003 | Savard | E02F 9/26 37/348 |
| 2004/0017471 A1* | 1/2004 | Suga | G08B 13/19667 348/E7.086 |
| 2010/0007796 A1 | 1/2010 | Yamaji et al. | |
| 2011/0115876 A1 | 5/2011 | Khot et al. | |
| 2012/0206605 A1 | 8/2012 | Buehler et al. | |
| 2013/0182066 A1* | 7/2013 | Ishimoto | E02F 9/261 348/38 |
| 2014/0240506 A1 | 8/2014 | Glover et al. | |
| 2014/0354816 A1 | 12/2014 | Inanobe et al. | |
| 2014/0375814 A1 | 12/2014 | Ishimoto et al. | |
| 2016/0112678 A1 | 4/2016 | Suvanen | |
| 2016/0138248 A1* | 5/2016 | Conway | E02F 9/261 701/34.2 |
| 2017/0030054 A1* | 2/2017 | Okumura | E02F 9/261 |
| 2017/0298595 A1* | 10/2017 | Machida | H04N 23/90 |
| 2017/0328029 A1 | 11/2017 | Tsuji et al. | |
| 2018/0073214 A1 | 3/2018 | Tsukamoto et al. | |
| 2018/0160054 A1 | 6/2018 | Gandhi et al. | |
| 2018/0202131 A1* | 7/2018 | Tsukamoto | E02F 5/32 |
| 2018/0244201 A1 | 8/2018 | Tsukamoto et al. | |
| 2019/0048559 A1* | 2/2019 | Olsen | E02F 9/264 |

FOREIGN PATENT DOCUMENTS

| | | | | |
|---|---|---|---|---|
| JP | 2002-128463 A | 5/2002 | | |
| JP | 2007-158860 A | 6/2007 | | |
| JP | 2011-001163 A | 1/2011 | | |
| JP | 2018-062733 A | 4/2018 | | |
| WO | WO-2013/118705 A1 | 8/2013 | | |
| WO | WO-2015/083322 A1 | 6/2015 | | |
| WO | WO-2017/014325 A1 | 1/2017 | | |
| WO | WO-2017/068992 A1 | 4/2017 | | |
| WO | WO-2017/068993 A1 | 4/2017 | | |
| WO | WO-2017068993 A1 * | 4/2017 | | B60R 1/00 |

* cited by examiner

DISPLAY SYSTEM FOR WORK MACHINE

TECHNICAL FIELD

The present disclosure relates to a display system for a work machine.

BACKGROUND ART

A display system for providing information relevant to remotely monitoring and operating a work machine is disclosed, for example, in U.S. Patent Application Publication No. 2014/0240506 (PTL 1). This document discloses that, of data of captured images associated with a plurality of work machines, data of captured images of the front, rear, front right and front left sides of a specific work machine captured by an in-vehicle camera of that work machine is enlarged and displayed on a display screen.

CITATION LIST

Patent Literature

PTL 1: U.S. Patent Application Publication No. 2014/0240506

SUMMARY OF INVENTION

Technical Problem

A work machine for example including an excavating blade frontward and a ripper rearward as work implements employs the excavating blade to perform an excavating operation and employs the ripper to perform a ripping operation, and simply travels without using the work implements. It is desirable that an amount of information displayed on a display screen include a larger amount of information corresponding to each operation.

The above document discloses that data of an image captured with the same in-vehicle camera is displayed on the display screen regardless of the type of work. However, when a large amount of data of captured images is displayed on the display screen in order to indicate a larger amount of information, each captured image's data is reduced and accordingly, an amount of information per captured image's data is reduced, and it is also difficult to select data of a captured image to be viewed.

The present disclosure provides a display system for a work machine that can increase an amount of information of data of a captured image displayed on a display unit.

Solution to Problem

According to the present disclosure, there is provided a display system for a work machine comprising a body of the work machine, a first work implement and a second work implement, a plurality of cameras, a display unit, and a display control unit. The first work implement and the second work implement are mounted to the body of the work machine. The plurality of cameras are mounted to the body of the work machine and each output data of a captured image. The display unit displays data of a captured image output from one or more of the plurality of cameras. The display control unit controls the display unit. The display control unit sets a plurality of divided display section on the display unit. The display control unit sets a first camera group and a second camera group including one or more of the plurality of cameras. The first camera group captures an image of a work performed with the first work implement. The second camera group captures an image of a work performed with the second work implement. The display control unit displays data of a captured image output from a camera included in either one of the first camera group and the second camera group in a corresponding one of the plurality of divided display sections.

Advantageous Effects of Invention

According to the present disclosure, an amount of information of data of a captured image displayed on a display unit can be increased.

DESCRIPTION OF EMBODIMENTS

In the following, an embodiment will be described based on the drawings. In the following description, identical components will be identically denoted. Their names and functions are also identical. Accordingly, they will not be described repeatedly.

[Configuration of Crawler Dozer 10]

Figure 1:
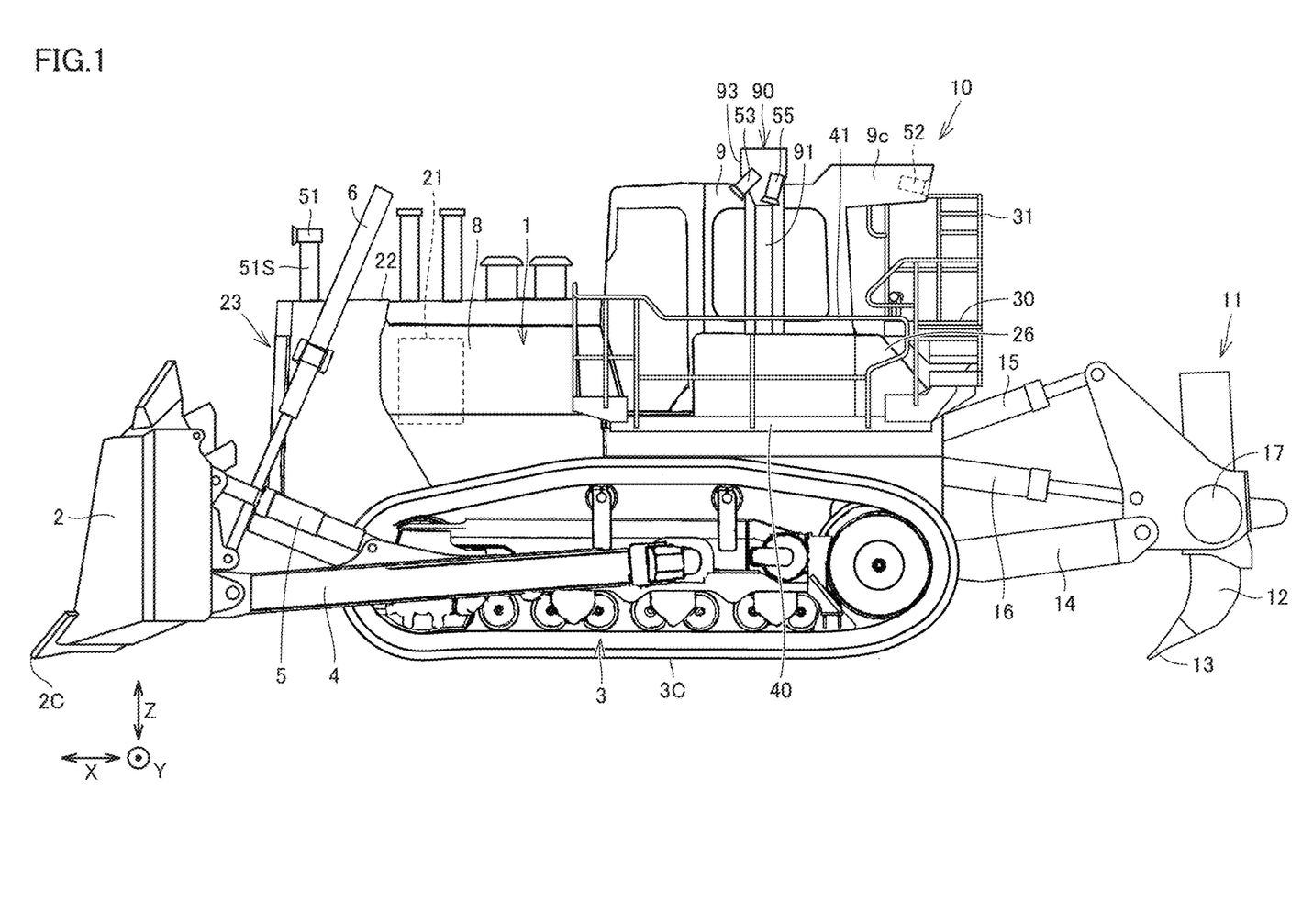
FIG. 1 is a side view schematically showing a configuration of a crawler dozer according to an embodiment.
Figure 2:
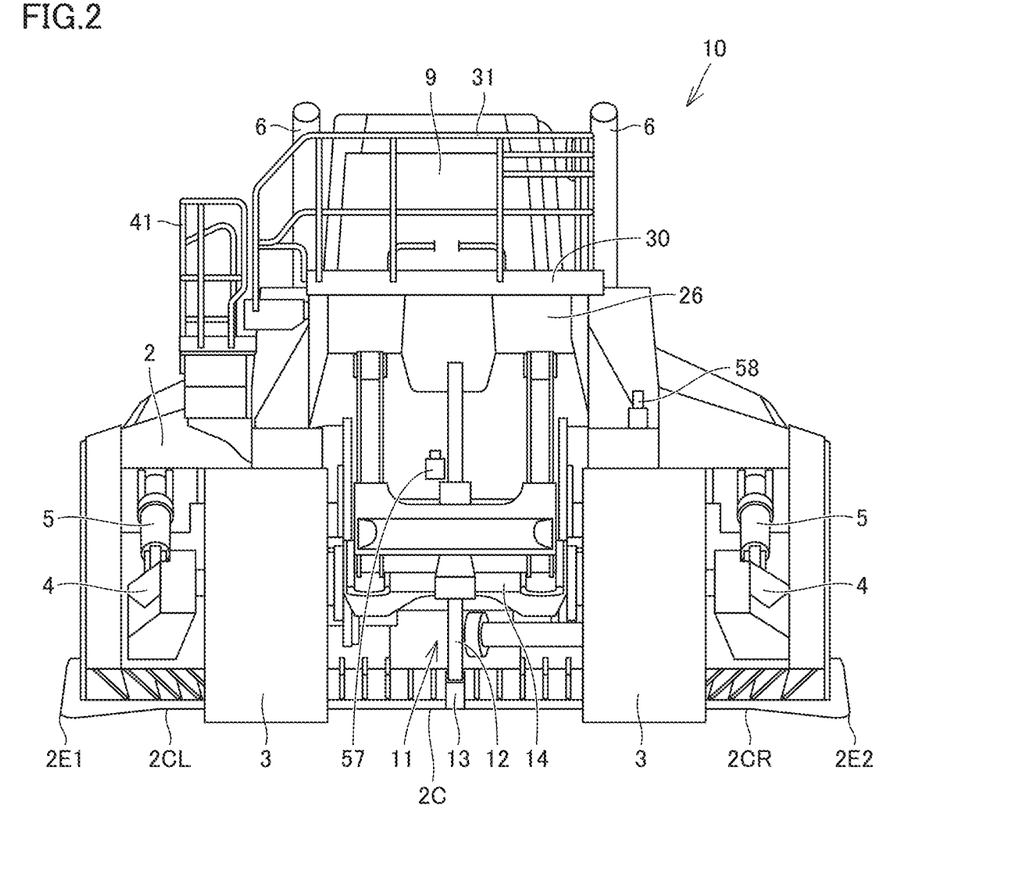
FIG. 2 is a rear view of the crawler dozer shown in FIG. 1.

Initially, a description will be given of a configuration of a crawler dozer 10 as an example of a work machine to which a display system of an embodiment is applicable. FIG. 1 is a side view schematically showing a configuration of crawler dozer 10 based on one embodiment. FIG. 2 is a rear view of crawler dozer 10 shown in FIG. 1.

As shown in FIGS. 1 and 2, crawler dozer 10 mainly includes a body 1, which corresponds to the body of the work machine in the embodiment, an excavating blade 2, and a travel unit 3. Excavating blade 2 is mounted to body 1. Excavating blade 2 is provided frontward of body 1. Travel unit 3 is a crawler belt type travel unit having a pair of right and left crawler belts 3C separated from each other in the vehicular widthwise direction. Body 1 is disposed between the paired right and left crawler belts 3C. Crawler dozer 10 travels as crawler belts 3C are driven.

Body 1 has a cab (operator's cab) 9 and an engine compartment 8. Cab 9 is disposed in an upper rear portion of body 1. Engine compartment 8 is disposed frontward of cab 9. Engine compartment 8 is disposed between cab 9 and excavating blade 2. An operator operating crawler dozer 10 is aboard cab 9. Cab 9 has an operator's seat therein for an operator to sit, and is configured to surround the operator's seat.

In the present embodiment, the direction in which crawler dozer 10 travels straight forward is referred to as front-rear direction of crawler dozer 10. In the front-rear direction of crawler dozer 10, the direction in which excavating blade 2 protrudes from body 1 is referred to as frontward direction. In the front-rear direction of crawler dozer 10, the direction opposite to the frontward direction is referred to as rearward direction. The right-left direction of crawler dozer 10 is the direction orthogonal to the front-rear direction as seen in plan view. From the viewpoint in the frontward direction, the right side and the left side in the right-left direction are respectively rightward direction and leftward direction. The top-bottom direction of crawler dozer is the direction orthogonal to a plane defined by the front-rear direction and the right-left direction. In the top-bottom direction, the ground side is lower side and the sky side is upper side.

The front-rear direction is the front-rear direction with respect to an operator sitting on the operator's seat in cab 9. The right-left direction is the right-left direction with respect to an operator sitting on the operator's seat. The right-left direction is the vehicular widthwise direction of crawler dozer 10. The top-bottom direction is the top-bottom direction with respect to an operator sitting on the operator's seat. The direction in which an operator sitting on the operator's seat faces is the frontward direction, and the backward direction with respect to an operator sitting on the operator's seat is the rearward direction. The right side and the left side with respect to an operator sitting on the operator's seat and facing frontward are respectively the rightward direction and the leftward direction. The feet side and the head side of an operator sitting on the operator's seat are respectively the lower side and the upper side.

In the following drawings, the front-rear direction is indicated by an arrow X, the right-left direction is indicated by an arrow Y, and the top-bottom direction is indicated by an arrow Z.

To the top end of the rear surface of cab 9, a condenser unit 9c is attached. Condenser unit 9c protrudes rearward from a rear portion of cab 9. Condenser unit 9c accommodates equipment, such as a heat exchanger and a blower, constituting an air conditioner for conditioning the air in cab 9.

Crawler dozer 10 includes, as a work implement, excavating blade 2 (a first work implement) located frontward of body 1. Excavating blade 2 is a work implement for performing work such as excavation of ground surface and grading. Excavating blade 2 is an example of a frontward work implement disposed frontward of body 1. Excavating blade 2 has a lower end with a cutting edge 2C. Cutting edge 2C constitutes a tip of an edge of excavating blade 2. Excavating blade 2 has a left side end portion 2CL at a left end portion of cutting edge 2C. Excavating blade 2 has a right side end portion 2CR at a right end portion of cutting edge 2C. Excavating blade 2 has a left lower end 2E1 and a right lower end 2E2.

Excavating blade 2 is supported at each of its right and left sides by a frame 4. Frame 4 is a member in the shape of a quadrangular prism. One end of frame 4 is attached to the back surface of excavating blade 2 by a rotatable support. The other end of frame 4 is supported on a side surface of travel unit 3.

Excavating blade 2 is actuated by tilt hydraulic cylinders 5 and lift hydraulic cylinders 6. One end of tilt hydraulic cylinder 5 is supported on the back surface of excavating blade 2. The other end of tilt hydraulic cylinder 5 is supported on the upper surface of frame 4. Tilt hydraulic cylinder 5 is extended/contracted by a hydraulic pressure to cause the top end of excavating blade 2 to move in the front-rear direction about the support with which frame 4 is attached to excavating blade 2. Accordingly, the tilt angle of excavating blade 2 is changed.

One end of lift hydraulic cylinder 6 is supported on the back surface of excavating blade 2. An intermediate portion of lift hydraulic cylinder 6 is supported on a side surface of body 1. Lift hydraulic cylinder 6 is extended/contracted by a hydraulic pressure to cause excavating blade 2 to move in the top-bottom direction about the other end of frame 4.

A front grille 23 is attached to body 1. Front grille 23 is disposed at the front end of body 1. Front grille 23 is disposed to cover an opening formed at the front end of body 1. Excavating blade 2 is disposed frontward of and spaced from front grille 23.

At the rear end of body 1, a fuel tank 26 is disposed. Fuel tank 26 is disposed rearward of cab 9. In fuel tank 26, fuel to be supplied to engine 21 is stored.

As shown in FIG. 1, the height of fuel tank 26 decreases toward the rear end as seen in side view. Fuel tank 26 has a taper surface inclining downward toward the rear end.

Crawler dozer 10 includes a ripper (a second work implement) 11 as another work implement located rearward of body 1. Ripper 11 is a work implement for ripping through and thereby breaking a hard material such as rock. Ripper 11 is mounted to body 1. Ripper 11 is provided rearward of body 1. The direction in which ripper 11 protrudes from body 1 in the front-rear direction of crawler dozer 10 is the rearward direction. Ripper 11 is disposed rearward of and spaced from fuel tank 26. Ripper 11 is an example of a rearward work implement disposed rearward of body 1.

Ripper 11 has a shank 12. At a tip end (the bottom end) of shank 12, a ripping tip 13 is provided. Ripping tip 13 of ripper 11 is thrust into a rock or the like to cut or break the rock by means of a traction force applied by travel unit 3. Ripper 11 is actuated by tilt cylinders 15 and lift cylinders 16.

A ripper arm 14 is provided below tilt cylinders 15 and lift cylinders 16. One end of ripper arm 14 is pivotably attached to body 1. To the other end of ripper arm 14, a beam 17 is attached pivotably with respect to ripper arm 14. Shank 12 is provided pivotably about beam 17, with respect to ripper arm 14.

An engine 21 as a driving source for crawler dozer 10 is accommodated in engine compartment 8. Engine 21 generates power which is in turn transmitted to a driving wheel of travel unit 3 via a drive train located inside body 1. As the driving wheel rotates, crawler belts 3C are driven, and crawler dozer 10 travels. Engine 21's power is also transmitted to a hydraulic pump. The hydraulic pump supplies pressurized oil to each actuator, such as tilt hydraulic cylinder 5 and lift hydraulic cylinder 6 for driving excavating blade 2, and tilt cylinder 15 and lift cylinder 16 for driving ripper 11.

Engine 21 is covered from above with an engine hood 22. Engine hood 22 forms a ceiling of engine compartment 8. Engine hood 22 separates an interior of engine compartment 8 and an exterior of engine compartment 8.

A work platform 30 is disposed above fuel tank 26. Work platform 30 is disposed rearward of cab 9. Work platform 30 is a scaffold for an operator to perform work behind cab 9. The works performed by an operator on work platform 30 are for example cleaning of a window of cab 9, replacing a filter and maintaining a breather of fuel tank 26, and cleaning of the condenser housed in condenser unit 9c, and the like. To work platform 30, a guardrail 31 is attached for preventing unexpected fall.

Along the left edge of body 1, an access passage 40 is provided to enable access to work platform 30 from the ground. To access passage 40, a guardrail 41 is attached for preventing unexpected fall.

A fall protection structure 90 is attached to crawler dozer 10. Fall protection structure 90 is standardized as ISO3471. In the rear view shown in FIG. 2, fall protection structure 90 is not shown for clarity of illustration. Fall protection structure 90 is provided in the form of a three-side frame.

Fall protection structure 90 has a left column 91, a beam 93, and a right column (not shown). Left column 91 is disposed on a left side of cab 9. The right column is disposed on a right side of cab 9. Beam 93 is disposed above cab 9. Beam 93 has a left end connected to an upper end of left column 91 and a right end connected to an upper end of the right column. Beam 93 is supported by left column 91 and the right column. Beam 93 extends in the right-left direction between left column 91 and the right column. Left column 91 and the right column are disposed at positions to overlap the operator's seat in cab 9 when cab 9 is laterally viewed. Beam 93 is disposed at a position to overlap the operator's seat in cab 9 when cab 9 is observed in a plan view.

A plurality of cameras are attached to crawler dozer 10. M cameras are attached to crawler dozer 10 where m is an integer equal to or greater than two. The plurality of cameras include a first camera 51, a second camera 52, a third camera 53, a fourth camera 54 (not shown in FIGS. 1 and 2), a fifth camera 55, a sixth camera 56 (not shown in FIGS. 1 and 2), a seventh camera 57, and an eighth camera 58.

First camera 51 captures an image frontward of body 1. First camera 51 captures an image in a range including a range frontward of body 1. Data of a captured image output by first camera 51 may include topography frontward of body 1. First camera 51 corresponds to a front camera in the embodiment. First camera 51 is attached to a support 51S. Support 51S protrudes upward from engine hood 22. First camera 51 is mounted to body 1 via support 51S. First camera 51 is fixed to be directed frontward and downward.

Second camera 52 captures an image rearward of body 1. Second camera 52 captures an image in a range including a range rearward of body 1. Data of a captured image output by second camera 52 may include topography rearward of body 1. Second camera 52 corresponds to a rear camera in the embodiment. Second camera 52 is attached to condenser unit 9c. Second camera 52 is accommodated in condenser unit 9c. Second camera 52 is mounted to body 1 via cab 9. Second camera 52 is fixed to be directed rearward and downward.

Third camera 53 captures an image of left side end portion 2CL of cutting edge 2C of excavating blade 2. Third camera 53 captures an image in a range including left lower end 2E1 of excavating blade 2. Data of a captured image output by third camera 53 may include left lower end 2E1 of excavating blade 2. Third camera 53 captures an image in a range including a point on the ground where left lower end 2E1 of excavating blade 2 penetrates a ground surface. Third camera 53 corresponds to a left blade camera in the embodiment. Third camera 53 is attached to left column 91 of fall protection structure 90. Third camera 53 is mounted to body 1 via fall protection structure 90. Third camera 53 is fixed to be directed frontward and downward.

Although not shown in FIGS. 1 and 2, fourth camera 54 is attached to the right column of fall protection structure 90. Fourth camera 54 is mounted to body 1 via fall protection structure 90. Fourth camera 54 is fixed to be directed frontward and downward. Fourth camera 54 captures an image of right side end portion 2CR of cutting edge 2C of excavating blade 2. Fourth camera 54 captures an image in a range including right lower end 2E2 of excavating blade 2. Data of a captured image output by fourth camera 54 may include lower right end 2E2 of excavating blade 2. Fourth camera 54 captures an image in a range including a point on the ground where right lower end 2E2 of excavating blade 2 penetrates a ground surface. Fourth camera 54 corresponds to a right blade camera in the embodiment.

Fifth camera 55 captures an image leftward of body 1. Fifth camera 55 captures an image in a range including a range leftward of body 1. Data of a captured image output by fifth camera 55 may include topography leftward of body 1. Fifth camera 55 corresponds to a left camera in the embodiment. Fifth camera 55 is attached to left column 91 of fall protection structure 90. Fifth camera 55 is mounted to body 1 via fall protection structure 90. Fifth camera 55 is fixed to be directed leftward and downward. Third camera 53 and fifth camera 55 are disposed to be adjacent to each other in the front-rear direction such that third camera 53 is on a front side and fifth camera 55 is on a rear side.

Although not shown in FIGS. 1 and 2, sixth camera 56 is attached to the right column of fall protection structure 90. Sixth camera 56 is mounted to body 1 via fall protection structure 90. Sixth camera 56 is fixed to be directed rightward and downward. Sixth camera 56 captures an image rightward of body 1. Sixth camera 56 captures an image in a range including a range rightward of body 1. Data of a captured image output by sixth camera 56 may include topography rightward of body 1. Sixth camera 56 corresponds to a right camera in the embodiment. Fourth camera 54 and sixth camera 56 are disposed to be adjacent to each other in the front-rear direction such that fourth camera 54 is on a front side and sixth camera 56 is on a rear side.

Seventh camera 57 captures an image of ripping tip 13 corresponding to a lower end of ripper 11. Seventh camera 57 captures an image in a range including ripping tip 13. Data of a captured image output by seventh camera 57 may include ripping tip 13. Seventh camera 57 corresponds to a ripping tip camera in the embodiment. Seventh camera 57 is attached to a rear surface of body 1. Seventh camera 57 is mounted to body 1 on a rear surface of body 1 in a vicinity of a center portion in the right-left direction. Seventh camera 57 is fixed to be directed rearward and downward.

Eighth camera 58 captures an image of right crawler belt 3C of the pair of right and left crawler belts 3C. Eighth camera 58 captures an image in a range including right crawler belt 3C. Data of a captured image output by eighth camera 58 may include right crawler belt 3C. Eighth camera 58 corresponds to a crawler belt camera in the embodiment. Eighth camera 58 is attached to a rear surface of body 1. Eighth camera 58 is mounted to body 1 on a rear surface of body 1 in a vicinity of a right edge portion in the right-left direction. Eighth camera 58 is disposed above right crawler belt 3C. Eighth camera 58 is fixed to be directed rearward and downward.

[System Configuration]

Figure 3:
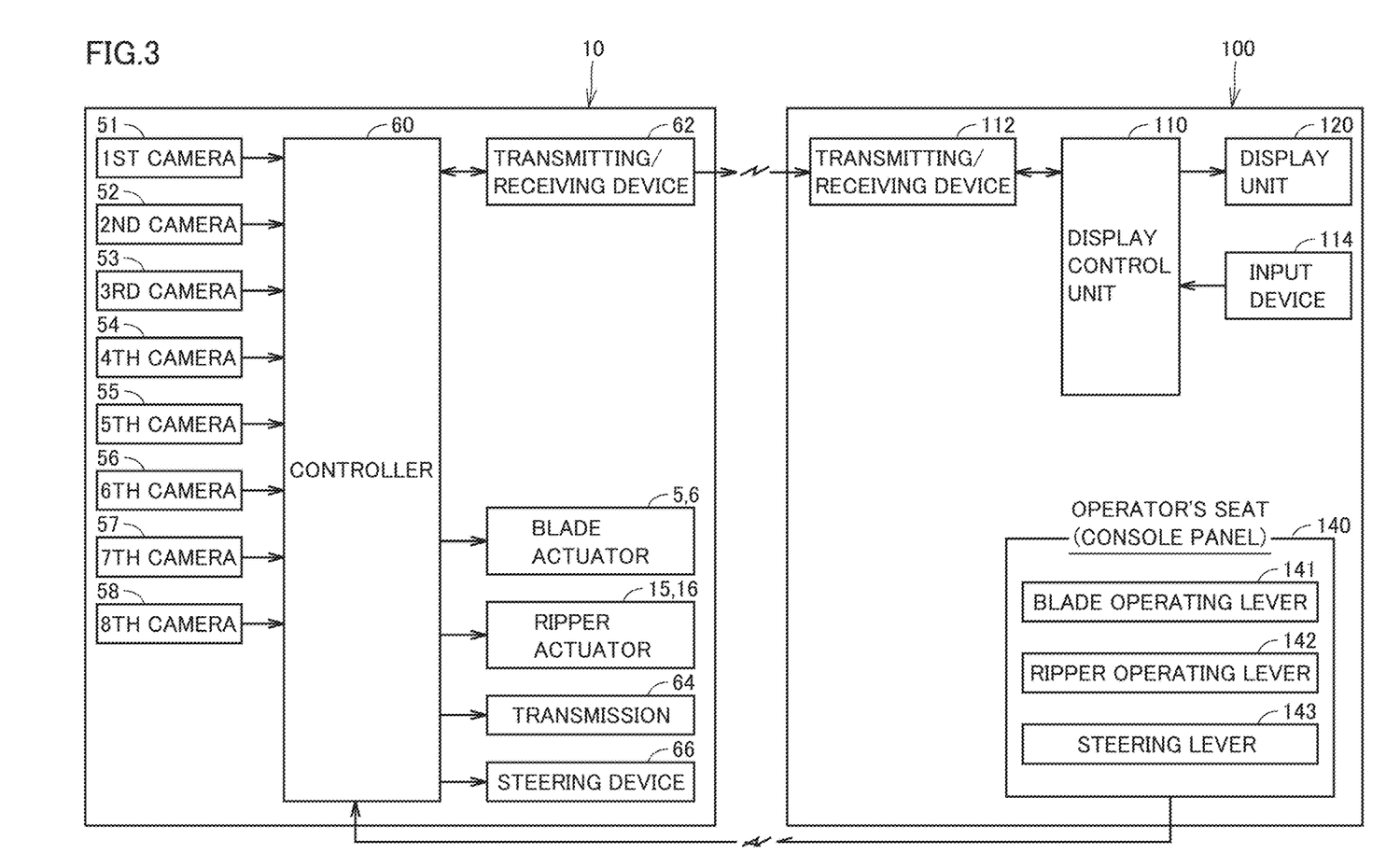
FIG. 3 is a block diagram schematically showing a configuration of a display system according to an embodiment.

FIG. 3 is a block diagram schematically showing a configuration of a display system according to an embodiment. As shown in FIG. 3, the display system includes crawler dozer 10 described with reference to FIGS. 1 and 2, and a remote control station 100.

Crawler dozer 10 includes a controller 60. Controller 60 controls an operation of crawler dozer 10 based on a program stored in a memory (not shown). Controller 60 receives data of an image captured by each of first to eighth cameras 51 to 58 and input thereby.

Controller 60 controls an operation of excavating blade 2 by outputting a control signal to a blade actuator, that is, tilt hydraulic cylinder 5 and lift hydraulic cylinder 6. When tilt hydraulic cylinder 5 and lift hydraulic cylinder 6 receive the control signal from controller 60, tilt hydraulic cylinder 5 and lift hydraulic cylinder 6 appropriately extend and contract and thus change a tilt angle of excavating blade 2 and move excavating blade 2 up and down.

Controller 60 controls an operation of ripper 11 by outputting a control signal to a ripper actuator, that is, tilt cylinder 15 and lift cylinder 16. When tilt cylinder 15 and lift cylinder 16 receive the control signal from controller 60, tilt cylinder 15 and lift cylinder 16 appropriately extend and contract and accordingly, shank 12 moves up and down, and ripping tip 13 at a tip of shank 12 also moves up and down.

Controller 60 controls traveling of crawler dozer 10 by outputting a control signal to a transmission 64 and a steering device 66.

Crawler dozer 10 has a transmitting/receiving device 62. Controller 60 sends a signal to remote control station 100 and receives a signal from remote control station 100 via transmitting/receiving device 62. Controller 60 sends data of a captured image output from first to eighth cameras 51 to 58 to remote control station 100 via transmitting/receiving device 62.

Remote control station 100 includes a display control unit 110, a transmitting/receiving device 112, an input device 114, and a display unit 120. Display control unit 110, transmitting/receiving device 112, input device 114, and display unit 120 are disposed in remote control station 100 remote from crawler dozer 10.

Display control unit 110 controls display unit 120. Display control unit 110 receives a signal from crawler dozer 10 and sends a signal to crawler dozer 10 via transmitting/receiving device 112. Display control unit 110 receives data of an image captured by first to eighth cameras 51 to 58 from crawler dozer 10 via transmitting/receiving device 112.

Input device 114 is operated by an operator. Input device 114 includes a switch for selecting a camera group which will be described hereinafter.

Display control unit 110 sets a plurality of divided display sections for display unit 120. Display control unit 110 sets n divided display sections for display unit 120, where n is an integer equal to or greater than one. The number n of divided display sections is smaller than a number m of cameras. Display control unit 110 displays data of a captured image output from one or more of first to eighth cameras 51 to 58 included in a selected camera group in a corresponding plurality of divided display sections. The camera group includes n cameras. For display unit 120, n divided display sections are set for displaying data of images captured by n cameras, respectively, included in the camera group out of data of captured images output from m cameras. In an embodiment described below, four divided display sections are set for displaying data of images captured by four cameras, respectively, out of data of captured images output from the eight cameras.

Remote control station 100 also has a console panel 140. Console panel 140 includes a blade operating lever 141, a ripper operating lever 142, and a steering lever 143. Blade operating lever 141, ripper operating lever 142, and steering lever 143 are manipulated by an operator. An operation done to console panel 140 is input to controller 60 of crawler dozer 10. When controller 60 receives the input of the operation of console panel 140, controller 60 in response thereto outputs a control signal to the blade actuator, the ripper actuator, transmission 64 or steering device 66 to operate these actuators.

Input device 114 and console panel 140 are arranged at a hand of an operator who views display unit 120. The operator can operate input device 114 and console panel 140 while viewing display unit 120.

[Operation]

Figure 4:
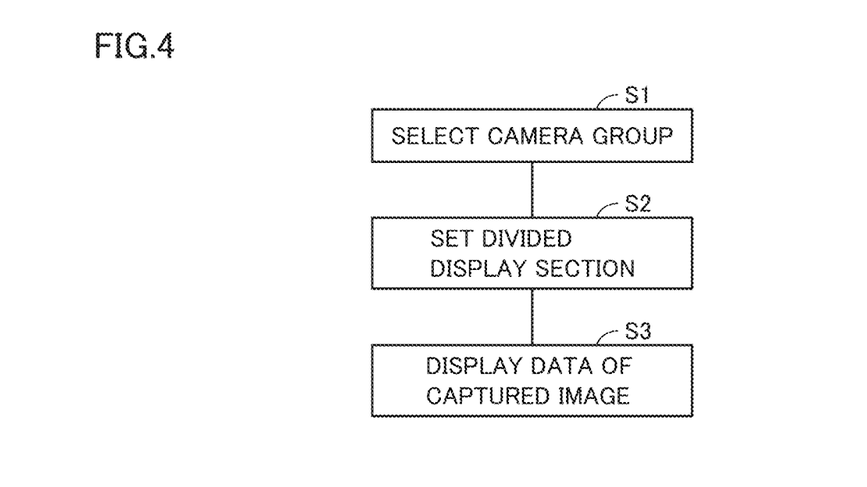
FIG. 4 is a flowchart of a process performed by a display control unit.

An operation of the display system comprising the above configuration will be described below. FIG. 4 is a flowchart of a process performed by display control unit 110.

As shown in FIG. 4, initially, in step S1, a camera group is selected. Input device 114 includes a switch for selecting a camera group. Display control unit 110 receives an input of an operation of the switch by an operator, and selects which camera group includes a camera that captures an image, data of the image captured by which is displayed on display unit 120.

Figure 5:
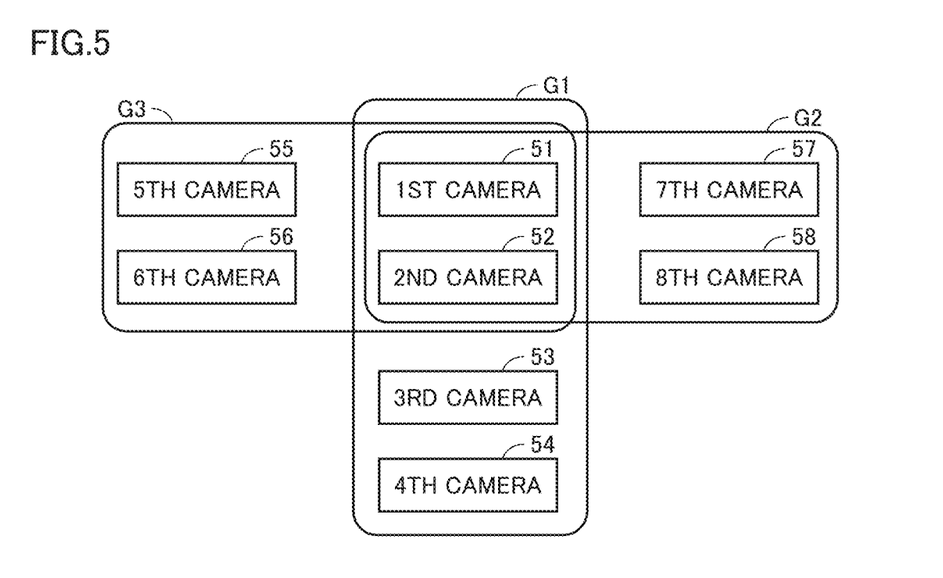
FIG. 5 is a schematic diagram of a camera group.

FIG. 5 is a schematic diagram showing camera groups G1 to G3. First to eighth cameras 51 to 58 mounted in crawler dozer 10 of the embodiment are classified into a first camera group G1, a second camera group G2, and a third camera group G3. Display control unit 110 sets first camera group G1, second camera group G2, and third camera group G3. First camera group G1, second camera group G2, and third camera group G3 each include one or more of the eight cameras.

First camera group G1 includes first camera 51, second camera 52, third camera 53, and fourth camera 54. First camera group G1 includes a first camera to capture an image in a range including a range frontward of body 1, third camera 53 to capture an image in a range including left side end portion 2CL of cutting edge 2C of excavating blade 2, and fourth camera 54 to capture an image in a range including right side end portion 2CR of cutting edge 2C of excavating blade 2, and images a work performed by excavating blade 2. First camera group G1 includes a camera which captures an image in a range including the lower right and left right ends of excavating blade 2.

Second camera group G2 includes first camera 51, second camera 52, seventh camera 57, and eighth camera 58. Second camera group G2 includes second camera 52 to capture an image in a range including a range rearward of body 1, seventh camera 57 to capture an image in range including ripping tip 13, and eighth camera 58 to capture an image in a range including right crawler belt 3C, and images a work performed by ripper 11. Second camera group G2 includes a camera which captures an image in a range including ripping tip 13 located at a lower end of ripper 11.

Third camera group G3 includes first camera 51, second camera 52, fifth camera 55, and sixth camera 56. Third camera group G3 includes first camera 51 to capture an image in a range including a range frontward of body 1, second camera 52 to capture an image in a range including a range rearward of body 1, fifth camera 55 to capture an image in a range including a range leftward of body 1, and sixth camera 56 to capture an image in a range including a range rightward of body 1, and images a periphery of crawler dozer 10 while crawler dozer 10 is traveling or stopped.

The operator operates a switch of input device 114 to cause display unit 120 to display data of an image captured by a desired camera. Display control unit 110 is notified of the operation of the switch input by the operator to input device 114. In response to the operation of the switch by the operator, display control unit 110 selects one of first to third camera groups G1 to G3 that includes a camera that outputs data of a captured image to be displayed on display unit 120.

A camera group may not be selected based on an operation of a switch by an operator. For example, an operation of console panel 140 by an operator is input to display control unit 110, and display control unit 110 may determine from the operation of console panel 140 whether crawler dozer 10 performs an operation of a work by excavating blade 2, a work by ripper 11, or simple traveling without using any work implement, and display control unit 110 may select one of first to third camera groups G1 to G3 based on a result of the determination.

For example, console panel 140 may be provided with a switch for switching a working mode. The operator may not operate a switch for selecting a camera group and instead select the switch for switching a working mode, and display control unit 110 may detect that a working mode is switched and display control unit 110 may select one camera group from first to third camera groups G1 to G3.

Alternatively, when the operator operates blade operating lever 141, it may be determined that excavating blade 2 is performing a work, and in this case, first camera group G1 may automatically be selected. When the operator manipulates ripper operating lever 142 it may be determined that ripper 11 is performing a work and in this case second camera group G2 may automatically be selected. When the operator manipulates neither blade operating lever 141 nor ripper operating lever 142, it may be determined that crawler dozer 10 is simply travelling or stopped, and in this case, third camera group G3 may automatically be selected.

Determination of operation of crawler dozer 10 is not limited to operation by an operator in remote control station 100, and may be done for example based on output of a control signal from controller 60 to actuators such as the blade actuator and the ripper actuator. For example, operation of crawler dozer 10 may be determined by detecting hydraulic pressure supplied to tilt hydraulic cylinder 5 and lift hydraulic cylinder 6 constituting the blade actuator.

Figure 6:
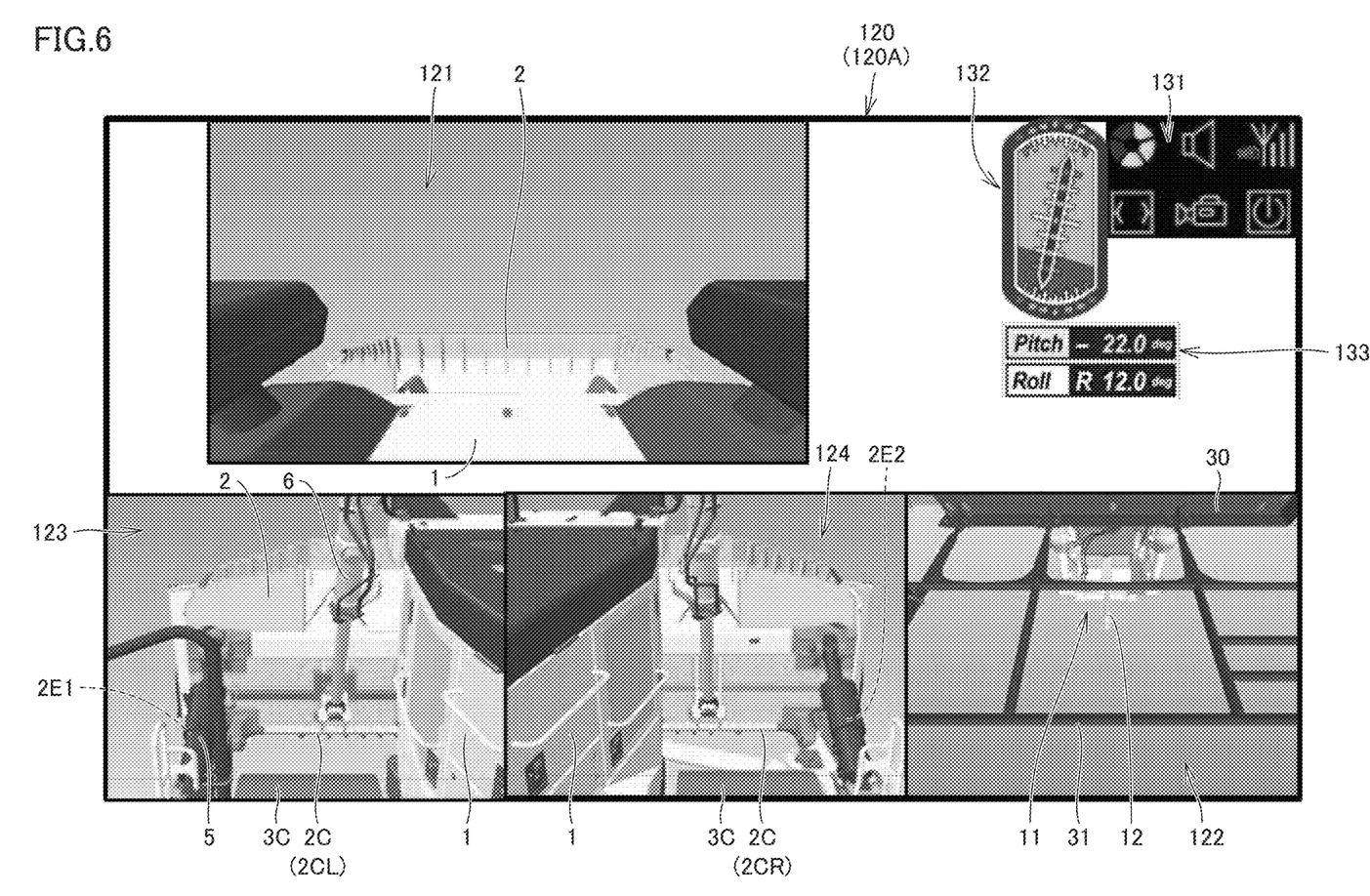
FIG. 6 is a schematic diagram showing a first example of data of a captured image displayed on a display unit.

Referring back to FIG. 4, subsequently, in step S2, a divided display section is set. FIG. 6 is a schematic diagram showing a first example of data of a captured image displayed on display unit 120.

Display control unit 110 sets a plurality of divided display sections for display unit 120. For display unit 120 (also referred to as a display unit 120A) shown in FIG. 6, a front display section 121, a rear display section 122, a left blade display section 123, and a right blade display section 124 are set as a plurality of divided display sections. Front display section 121 displays data of a captured image output from first camera 51. Rear display section 122 displays data of a captured image output from second camera 52. Left blade display section 123 displays data of a captured image output from third camera 53. Right blade display section 124 displays data of a captured image output from fourth camera 54.

Display control unit 110 sets left blade display section 123, right blade display section 124, and rear display section 122 to be aligned in this order from left to right. Left blade display section 123, right blade display section 124, and rear display section 122 are set to have the same shape of a laterally long rectangle and have the same area.

Display control unit 110 sets front display section 121 above the row of left blade display section 123, right blade display section 124, and rear display section 122. Front display section 121 is set in the form of a laterally long rectangle, and is set to be laterally longer than left blade display section 123, right blade display section 124, and rear display section 122. Front display section 121 is set to be larger than the divided display sections other than front display section 121, that is, left blade display section 123, right blade display section 124, and rear display section 122. Front display section 121 is set to have a larger area than left blade display section 123, right blade display section 124, and rear display section 122.

Display control unit 110 sets left blade display section 123 and right blade display section 124 to be laterally aligned such that left blade display section 123 is arranged on a left side and right blade display section 124 is arranged on a right side. Display control unit 110 sets front display section 121 above left blade display section 123 and right blade display section 124. Display control unit 110 sets front display section 121 such that front display section 121 is centered at a boundary of left blade display section 123 and right blade display section 124.

Display control unit 110 sets various icons 131, a tilt meter 132, and a tilt indicator 133 at an upper right corner of display unit 120. Tilt meter 132 and tilt indicator 133 display the pitch and roll angles of crawler dozer 10 relative to the horizontal plane.

Figure 7:
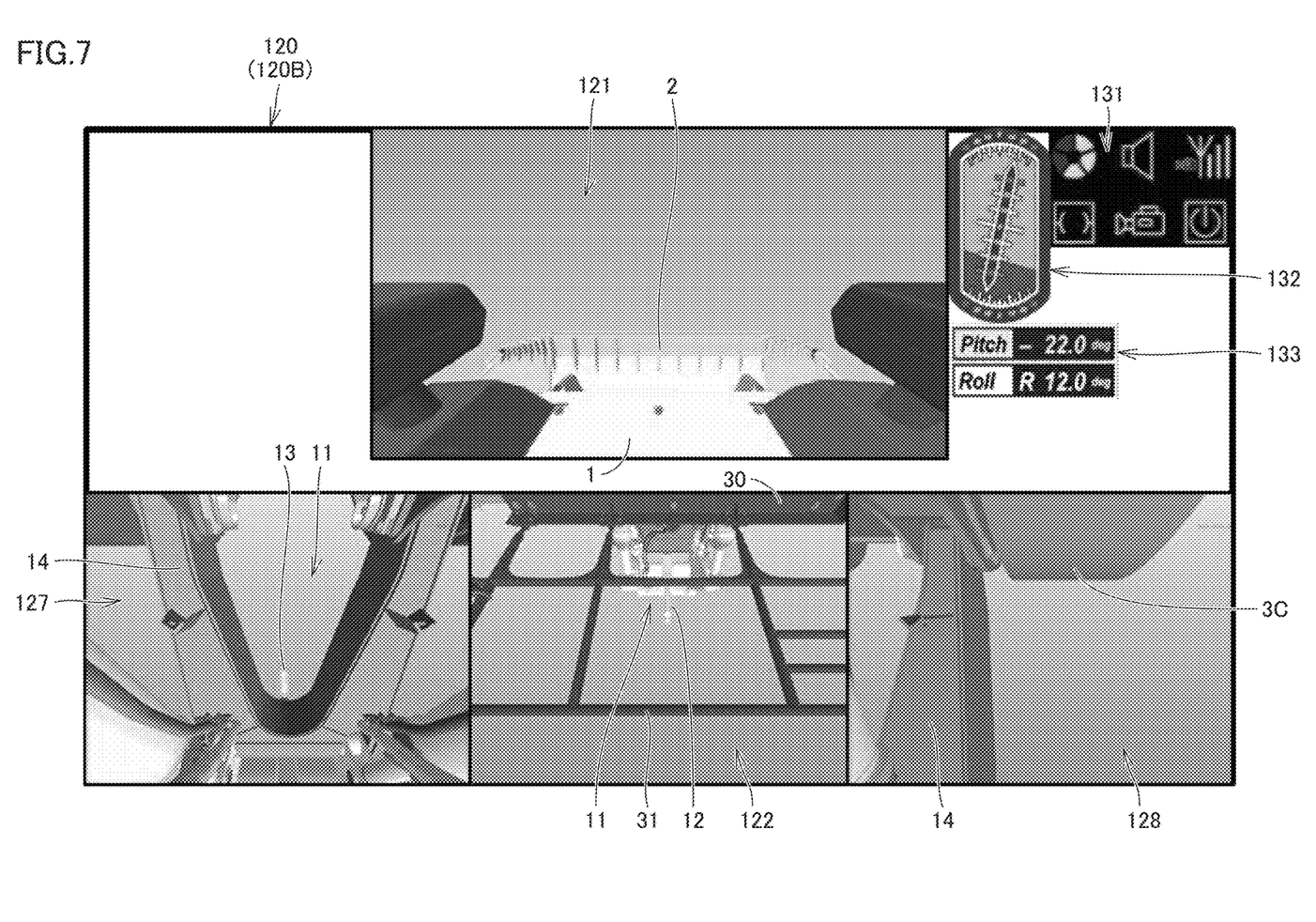
FIG. 7 is a schematic diagram showing a second example of data of a captured image displayed on the display unit.

FIG. 7 is a schematic diagram showing a second example of data of a captured image displayed on display unit 120. For display unit 120 (also referred to as a display unit 120B) shown in FIG. 7, front display section 121, rear display section 122, a ripping tip display section 127, and a crawler belt display section 128 are set as a plurality of divided display sections. Ripping tip display section 127 displays data of a captured image output from seventh camera 57. Crawler belt display section 128 displays data of a captured image output from eighth camera 58.

Display control unit 110 sets ripping tip display section 127, rear display section 122, and crawler belt display section 128 to be aligned in this order from left to right. Ripping tip display section 127, rear display section 122, and crawler belt display section 128 are set to have the same shape of a laterally long rectangle and to have the same area.

Display control unit 110 sets front display section 121 above the row of ripping tip display section 127, rear display section 122, and crawler belt display section 128. Front display section 121 is set in the form of a laterally long rectangle and is set to be laterally longer than ripping tip display section 127, rear display section 122, and crawler belt display section 128. Front display section 121 is set to be larger than the divided display sections other than front display section 121, that is, ripping tip display section 127, rear display section 122, and crawler belt display section 128. Front display section 121 is set to have a larger area than ripping tip display section 127, rear display section 122, and crawler belt display section 128.

Display control unit 110 sets front display section 121 and rear display section 122 to be vertically aligned such that front display section 121 is arranged on an upper side and rear display section 122 is arranged on a lower side. Display control unit 110 sets front display section 121 and rear display section 122 centered. Display control unit 110 sets ripping tip display section 127 on a left side of front display section 121 and rear display section 122 that are aligned. Display control unit 110 sets crawler belt display section 128 on a right of front display section 121 and rear display section 122 that are aligned.

Figure 8:
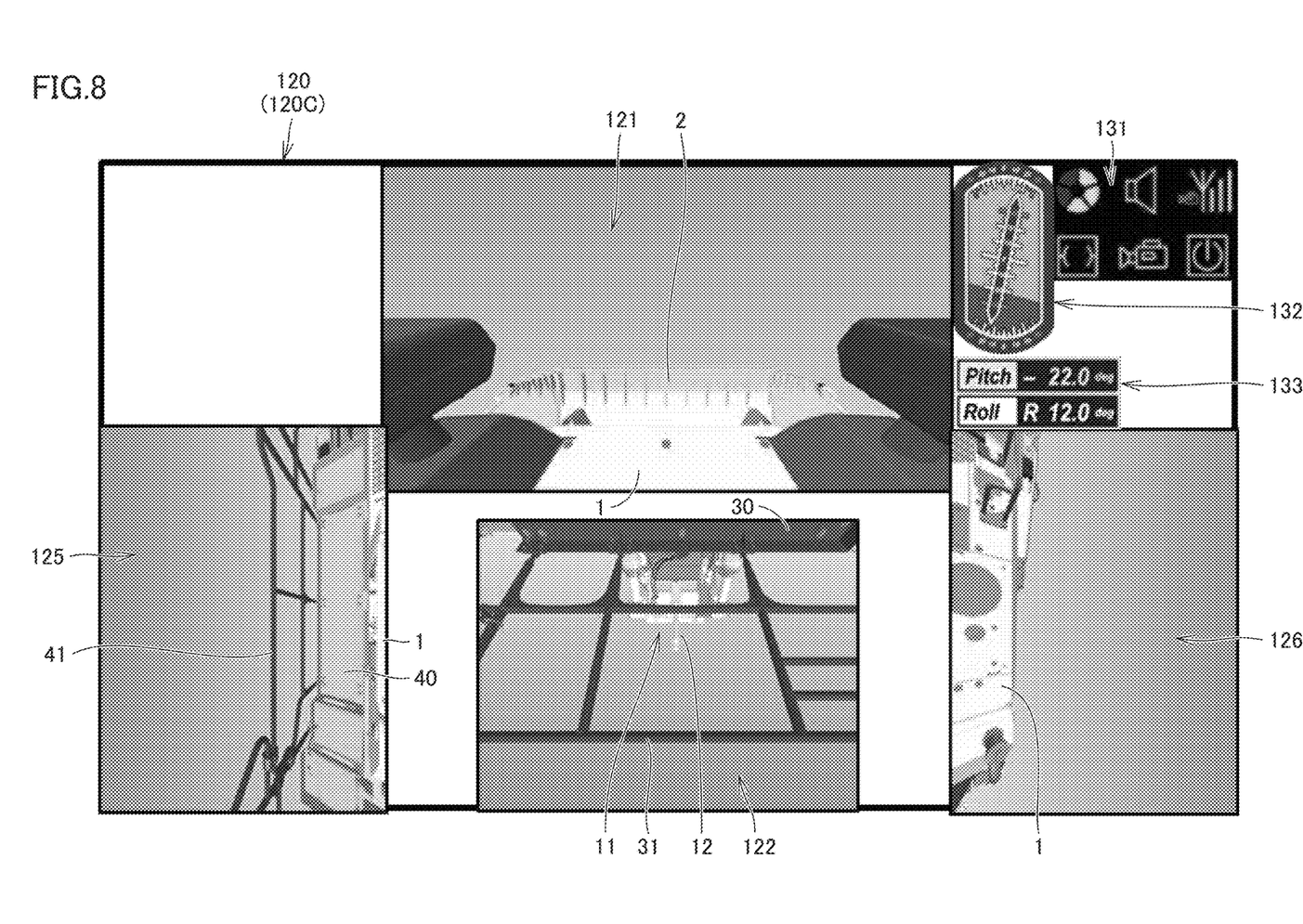
FIG. 8 is a schematic diagram showing a third example of data of a captured image displayed on the display unit.

FIG. 8 is a schematic diagram showing a third example of data of a captured image displayed on display unit 120. For display unit 120 (also referred to as a display unit 120C) shown in FIG. 8, front display section 121, rear display section 122, a left display section 125, and a right display section 126 are set as a plurality of divided display sections. Left display section 125 displays data of a captured image output from fifth camera 55. Right display section 126 displays data of a captured image output from sixth camera 56.

Display control unit 110 sets front display section 121 and rear display section 122 to be vertically aligned such that that front display section 121 is arranged on an upper side and rear display section 122 is arranged on a lower side. Display control unit 110 sets front display section 121 and rear display section 122 centered. Display control unit 110 sets left display section 125 on a left side of front display section 121 and rear display section 122 that are aligned. Display control unit 110 sets right display section 126 on a right of front display section 121 and rear display section 122 that are aligned.

Rear display section 122 is set in the form of a laterally long rectangle. Left display section 125 and right display section 126 are set in the form of a vertically long rectangle obtained by rotating the laterally long rectangle of rear display section 122 by 90°. Rear display section 122, left display section 125, and right display section 126 are set to have the same area.

Front display section 121 is set in the form of a laterally long rectangle, and is set to be laterally longer than rear display section 122. Front display section 121 is set to have a larger area than the divided display sections other than front display section 121, that is, rear display section 122, left display section 125, and right display section 126.

In step S2, display control unit 110 sets in display unit 120 divided display sections corresponding to a camera group selected in step S1. More specifically, when first camera group G1 is selected based on an operation of input device 114 by an operator or the like, the divided display sections shown in FIG. 6 are set in display unit 120. When second camera group G2 is selected, the divided display sections shown in FIG. 7 are set. When third camera group G3 is selected, the divided display sections shown in FIG. 8 are set.

Subsequently, in step S3, data of a captured image is displayed on display unit 120. When first camera group G1 is selected in step S1, display control unit 110 displays data of captured images output from cameras included in first camera group G1 in a corresponding plurality of divided display sections of display unit 120A shown in FIG. 6. Specifically, display control unit 110 displays data of a captured image output from first camera 51 in front display section 121, data of a captured image output from second camera 52 in rear display section 122, data of a captured image output from third camera 53 in left blade display section 123, and data of a captured image output from fourth camera 54 in right blade display section 124.

When second camera group G2 is selected in step S1, display control unit 110 displays data of captured images output from cameras included in second camera group G2 in a corresponding plurality of divided display sections of display unit 120B shown in FIG. 7. Specifically, display control unit 110 displays data of a captured image output from first camera 51 in front display section 121, data of a captured image output from second camera 52 in rear display section 122, data of a captured image output from seventh camera 57 in ripping tip display section 127, and data of a captured image output from eighth camera 58 in crawler belt display section 128.

Ripping tip display section 127 shown in FIG. 7 displays ripping tip 13. Ripping tip display section 127 shows a point at which ripping tip 13 on the ground penetrates into the ground. During the ripping operation, ripping tip 13 may be hidden in the soil and not displayed in ripping tip display section 127, and even in that case, ripping tip 13 is present within a range in which seventh camera 57 captures an image.

When third camera group G3 is selected in step S3, display control unit 110 displays data of captured images output from cameras included in third camera group G3 in a corresponding plurality of divided display sections of display unit 120C shown in FIG. 8. Specifically, display control unit 110 displays data of a captured image output from first camera 51 in front display section 121, data of a captured image output from second camera 52 in rear display section 122, data of a captured image output from fifth camera 55 in left display section 125, and data of a captured image output from sixth camera 56 in right display section 126.

In this manner, an image displayed on display unit 120 is changed depending on the work. Display control unit 110 sets a plurality of divided display sections in display unit 120, and switches a prescribed combination of data of captured images corresponding to each work out of data of images captured by a plurality of cameras (first to eighth cameras 51 to 58) and displays it in a corresponding plurality of divided display sections.

[Function and Effect]

Hereinafter, a function and effect of the above-described embodiment will be described.

In the embodiment, display control unit 110 sets first camera group G1 to capture an image of a work performed by an excavating blade and a second camera group G2 to capture an image of a work performed by a ripper. Display control unit 110 also sets a plurality of divided display sections for display unit 120. As shown in FIGS. 4, 6, and 7, display control unit 110 selects one camera group from first camera group G1 and second camera group G2 and displays data of captured images output from cameras included in the selected camera group in a corresponding plurality of divided display sections. Display control unit 110 sets a position and a size for a plurality of divided display sections in display unit 120 for each of first camera group G1 and second camera group G2.

Of first to eighth cameras 51 to 58 mounted to body 1 of crawler dozer 10, a camera corresponding to a work is selected, and data of a captured image output from the selected camera is displayed on display unit 120. Rather than constantly displaying data of images captured by eight cameras 51 to 58, displaying data of an unnecessary captured image can be avoided to reduce an amount of data of captured images displayed on display unit 120 and hence an amount of data communicated, which facilitates displaying data of a captured image in real time. In addition, reducing the amount of data of captured images displayed allows each divided display section to have an increased size and display unit 120 to display data of a captured image with an increased amount of information. The operator can easily view display unit 120, and thus easily steer crawler dozer 10 from remote control station 100.

As shown in FIGS. 1 and 5, first camera group G1 includes first camera 51 that captures an image in a range including a range frontward of body 1, third camera 53 that captures an image in a range including left side end portion 2CL of cutting edge 2C of excavating blade 2, and fourth camera 54 that captures an image in a range including right side end portion 2CR of cutting edge 2C of excavating blade 2. Third camera 53 captures an image in a range including a position where left lower end 2E1 of excavating blade 2 penetrates into the ground. Fourth camera 54 captures an image in a range including a position where right lower end 2E2 of excavating blade 2 penetrates into the ground. When excavating blade 2 is employed to perform a work, first camera group G1 corresponding to the work can be selected to display topography frontward of body 1 and left side end portion 2CL and right side end portion 2CR of cutting edge 2C of excavating blade 2 on display unit 120 in a large size. The operator can easily perform a work with the blade while viewing display unit 120.

As shown in FIG. 6, display control unit 110 sets left blade display section 123 and right blade display section 124 to be laterally aligned, and sets front display section 121 to be centered at the boundary of left blade display section 123 and right blade display section 124. By arranging front display section 121, left blade display section 123, and right blade display section 124 in this manner, data of captured images of a front side of body 1 and both lower ends 2E1 and 2E2 of excavating blade 2 can be arranged to resemble visual observation by the operator inside cab 9, and the operator can more easily view the data of each captured image.

As shown in FIGS. 1, 2, and 5, second camera group G2 includes second camera 52 that captures an image in a range including a range rearward of body 1, seventh camera 57 that captures an image in a range including ripping tip 13, and eighth camera 58 that captures an image in a range including right crawler belt 3C. When ripper 11 is employed to perform a work, second camera group G2 corresponding to the work can be selected to display topography rearward of body 1, ripping tip 13, and crawler belt 3C on display unit 120 in a large size. The operator can easily perform a ripping operation while viewing display unit 120, and can also confirm whether crawler belt 3C idles during the ripping operation.

As shown in FIG. 7, display control unit 110 sets ripping tip display section 127, rear display section 122, and crawler belt display section 128 to be aligned in this order from left to right. Ripping tip display section 127, rear display section 122, and crawler belt display section 128 thus arranged allow the operator to more easily view data of a captured image displayed on each divided display section.

Display control unit 110 sets third camera group G3 to capture an image around crawler dozer 10 when crawler dozer 10 travels. As shown in FIGS. 1 and 5, third camera group G3 includes first camera 51, second camera 52, fifth camera 55, and sixth camera 56 that capture images in ranges frontward, rearward, leftward, and rightward, respectively, of body 1. When crawler dozer 10 travels, third camera group G3 corresponding to a work can be selected to allow topography around crawler dozer 10 to be displayed on display unit 120 in a large size. The operator can cause crawler dozer 10 to safely travel while viewing display unit 120.

As shown in FIGS. 6 to 8, display control unit 110 sets front display section 121 to be larger than the other divided display sections. By increasing the size of front display section 121 that is frequently viewed during a work, data of an image captured in front of body 1 can be displayed in a large size, and the operator can perform a work while easily confirming a state in front of body 1.

In the above description of the embodiment, crawler dozer 10 comprising excavating blade 2 and ripper 11 has been described as an example of a work machine. Crawler dozer 10 may include another type of rearward work implement instead of ripper 11. For example, crawler dozer 10 may include a winch behind body 1 and seventh camera 57 may be configured to capture an image in a range including the winch.

The work machine is not limited to crawler dozer 10. For example, the concept of the present disclosure is applicable to other types of work machines, such as a motor grader comprising a blade between a front wheel and a rear wheel and a ripper behind a body.

It should be understood that the embodiment disclosed herein is illustrative and not restrictive in any respects. The scope of the present invention is defined by the claims, rather than the above description, and is intended to include any modifications within the meaning and range equivalent to the claims.

REFERENCE SIGNS LIST 1 body, 2 excavating blade (first work implement), 2C cutting edge, 2CL left side end portion, 2CR right side end portion, 2E1 left lower end, 2E2 right lower end, 3 travel unit, 3C crawler belt, 5 tilt hydraulic cylinder, 6 lift hydraulic cylinder, 8 engine compartment, 9 cab, 9c condenser unit, 10 crawler dozer, 11 ripper (second work implement), 12 shank, 13 ripping tip, 14 ripper arm, 15 tilt cylinder, 16 lift cylinder, 17 beam, 21 engine, 22 engine hood, 51 first camera, 51S support, 52 second camera, 53 third camera, 54 fourth camera, 55 fifth camera, 56 sixth camera, 57 seventh camera, 58 eighth camera, 60 controller, 62, 112 transmitting/receiving device, 64 transmission, 66 steering device, 90 fall protection structure, 91 left column, 93 beam, 100 remote operation station, 110 display control unit, 114 input device, 120 display unit, 121 front display section, 122 rear display section, 123 left blade display section, 124 right blade display section, 125 left display section, 126 right display section, 127 ripping tip display section, 128 crawler belt display section, 131 icon, 132 tilt meter, 133 tilt indicator, 140 console panel, 141 blade operating lever, 142 ripper operating lever, 143 steering lever, G1 first camera group, G2 second camera group, and G3 third camera group.

The invention claimed is:

1. A display system for a crawler dozer, comprising:
a body of the crawler dozer;
a first work implement and a second work implement mounted to the body of the crawler dozer, wherein the first work implement is a blade having a lower end with a cutting edge;
a plurality of cameras mounted to the body of the crawler dozer to each output data of a captured image;
a display that displays data of a captured image output from one or more of the plurality of cameras; and
a display controller that controls the display,
the display controller setting a plurality of divided display sections for the display,
the display controller setting a first camera group including one or more of the plurality of cameras to capture an image of a work performed by the first work implement, and a second camera group including one or more of the plurality of cameras to capture an image of a work performed by the second work implement,
wherein the first camera group includes a front camera that captures an image in a range including a range frontward of the body of the crawler dozer, a left blade camera that captures an image in a range including a left side end portion of the lower end with the cutting edge of the blade, and a right blade camera that captures an image in a range including a right side end portion of the lower end with the cutting edge of the blade, and the display controller causing the plurality of divided display sections to display data of a captured image output from a camera included in one of the first and second camera groups, wherein the display controller sets, as the plurality of divided display sections, a front display section that displays data of a captured image output from the front camera, a left blade display section that displays data of a captured image output from the left blade camera, and a right blade display section that displays data of a captured image output from the right blade camera, the display controller sets the left blade display section and the right blade display section to be laterally aligned and side-by-side such that the left blade display section is on a left side and the right blade display section is on a right side, and the display controller sets the front display section above the left blade display section and the right blade display section and centered at a boundary of the left blade display section and the right blade display section.

2. The display system according to claim 1, wherein the second work implement is a ripper.

3. The display system according to claim 2, further comprising a travel unit including a crawler belt, the body of the crawler dozer being disposed on the travel unit, wherein the ripper has a tip with a ripping tip, and the second camera group includes a rear camera that captures an image in a range including a range rearward of the body of the crawler dozer, a ripping tip camera that captures an image in a range including the ripping tip, and a crawler belt camera that captures an image in a range including the crawler belt.

4. The display system according to claim 3, wherein the display controller sets, as the plurality of divided display sections, a rear display section that displays data of a captured image output from the rear camera, a ripping tip display section that displays data of a captured image output from the ripping tip camera, and a crawler belt display section that displays data of a captured image output from the crawler belt camera, and the display controller sets the ripping tip display section, the rear display section, and the crawler belt display section to be aligned in this order from left to right.

5. The display system according to claim 1, wherein the display controller sets a third camera group including one or more of the plurality of cameras to capture an image around the crawler dozer when the crawler dozer travels, the display controller causes the divided display section to display data of a captured image output from a camera included in any one of the first camera group, the second camera group, and the third camera group, and the third camera group includes a front camera that captures an image in a range including a range frontward of the body of the crawler dozer, a rear camera that captures an image in a range including a range rearward of the body of the crawler dozer, a left camera that captures an image in a range including a range leftward of the body of the crawler dozer, and a right camera that captures an image in a range including a range rightward of the body of the crawler dozer.

6. The display system according to claim 1, wherein the display controller sets a front display section that displays data of a captured image output from a front camera that captures an image in a range including a range frontward of the body of the crawler dozer to be larger than the divided display section other than the front display section.

7. A display system for a crawler dozer, comprising:

a body of the crawler dozer;

a first work implement and a second work implement mounted to the body of the crawler dozer, wherein the first work implement is a blade having a lower end with a cutting edge;

m cameras mounted to the body of the crawler dozer to each output data of a captured image, where m is an integer equal to or greater than two;

a display that displays data of a captured image output from one or more of the m cameras; and a display controller that controls the display, wherein the display controller sets n divided display sections for the display where n is an integer equal to or greater than one and less than m, and the divided display sections each display data of a captured image output from a camera associated therewith, the display controller sets a first camera group composed of n cameras of the m cameras including a camera that captures an image of a lower end of the first work implement, and a second camera group composed of n cameras of the m cameras including a camera that captures an image of a lower end of the second work implement, wherein the first camera group includes a front camera that captures an image in a range including a range frontward of the body of the crawler dozer, a left blade camera that captures an image in a range including a left side end portion of the lower end with the cutting edge of the blade, and a right blade camera that captures an image in a range including a right side end portion of the lower end with the cutting edge of the blade, and the display controller displays data of a captured image output from a camera included in one of the first and second camera groups such that the data each correspond to an associated one of the n divided display sections, wherein the display controller sets, as the n divided display sections, a front display section that displays data of a captured image output from the front camera, a left blade display section that displays data of a captured image output from the left blade camera, and a right blade display section that displays data of a captured image output from the right blade camera, the display controller sets the left blade display section and the right blade display section to be laterally aligned and side-by-side such that the left blade display section is on a left side and the right blade display section is on a right side, and the display controller sets the front display section above the left blade display section and the right blade display section and centered at a boundary of the left blade display section and the right blade display section.

8. The display system according to claim 7, wherein the display controller sets a position and a size for the n divided display sections in the display for each of the first camera group and the second camera group.

* * * * *